2,950,321

PRODUCTION OF BETA-IONYLIDENE-ETHYL-TRIARYL PHOSPHONIUM HALIDES

Wilhelm Sarnecki and Horst Pommer, Ludwigshafen (Rhine), Germany, assignors to Badische Anilin- & Soda-Fabrik Aktiengesellschaft, Ludwigshafen (Rhine), Germany No Drawing. Filed Aug. 29, 1958, Ser. No. 757,894

Claims priority, application Germany, Sept. 3, 1957

7 Claims. (Cl. 260—606.5)

This invention relates to a new and improved process for the production of beta-ionylidene-ethyl-triaryl-phosphonium halides. The preparation of beta-ionylidene-ethyl-triaryl phosphonium halides from triaryl phosphines and beta-ionylidene-ethyl halides is known from German patent specification No. 954,247. The beta-ionylidene-ethyl-triaryl-phosphonium halides, for example beta-ionylidene-ethyl-triphenyl-phosphonium bromide, are obtained only in an impure form as a non-distillable oil. Moreover the beta-ionylidene ethyl halides necessary for this process must be obtained from beta-ionylidene ethanol; for its preparation, however, only expensive and multi-stage methods have hitherto been known (cf. for example H. O. Huisman and collaborators, Rec. Trav. Chim. 75, 982, (1952)).

We have now found that beta-ionylidene-ethyl-triarylphosphonium halides are obtained in a considerably simpler way and with good yields in crystallized form by treating 5-(2'.6'.6'-trimethyl-cyclohexene(1')-yl - (1'))-3-methyl-pentadiene-(1.4)-ol-(3) (vinyl-beta-ionol) with a triarylphosphine hydrohalide or with a triarylphosphine and a hydrogen halide.

The new process may be formulated as follows for the production of beta-ionylidene-ethyl-triphenylphosphonium bromide from 5-(2'.6'.6'-trimethyl-cyclohexene - (1')-yl-(1'))-3-methyl-pentadiene - (1.4) - ol-(3) and triphenylphosphine hydrobromide:

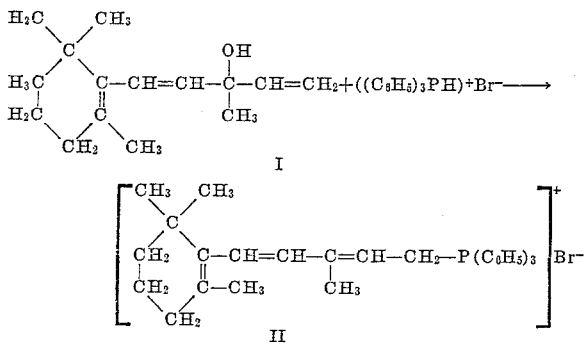

This reaction stage is especially surprising since it has been known for a long time that 5-(2'.6'.6'-trimethyl-cyclohexene-(1') - yl - (1'))-3-methyl-pentadiene-(1.4)-ol-(3) (I) cannot be rearranged to beta-ionylidene ethanol and furthermore that all compounds of the general constitution:

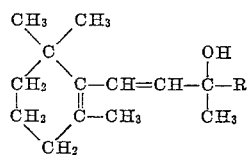

(in which R represents —CH=CH—R' or
—CH₂—CH=CH—R' and R' represents a saturated or unsaturated aliphatic radical which may also contain functional groups) tend to anomalous allyl-rearrangement, the so-called retro-ionylidene rearrangement (cf, for example H. O. Huisman and collaborators, Rec. Trav. Chim. 71, 899 (1952), 75, 977 (1956); W. Oroshnik and collaborators, J. Am. Chem. Soc. 74, 295, 3807 (1952); J. A. Baxter, Fortschritte der Chemie organischer Naturstoffe 9, 41 (1952); P. Karrer, J. Kehrle, Helv. Chim. Acta 25, 2570 (1952)).

A considerable advance is therefore achieved by the new process. It is especially important for industry because the beta - ionylidene - ethyl - triarylphosphonium halides obtained are preferred initial materials for the syntheses of biologically highly active carotenoids of the type of beta-carotene and vitamine A (cf. for example the German patent specifications Nos. 954,247 and 1,025,-869). There is the further advantage that the 5-(2'.6'.6.-trimethyl-cyclohexene - (1') - yl - (1')-3-methyl-pentadiene-(1.4)-ol-(3) necessary as initial material is readily accessible in a simple way by ethinylation of beta-ionone and partial hydrogenation of the beta-ethinyl ionol thus formed.

Triarylphosphonium halides suitable for the process according to this invention are derived on the one hand from hydrochloric, hydrobromic and hydroiodic acids and on the other hand from triarylphosphines in which the aryl radical may be a substituted or unsubstituted phenyl radical. Triphenylphosphine is preferred because it is, as the simplest triarylphosphine, especially readily accessible. According to the invention there may be employed, however, also triphenylphosphines substituted by lower alkyl radicals, such as methyl and ethyl. Instead of the ready-made triarylphosphine hydrohalides, hydrogen halide and triarylphosphine may be added as such to the reaction mixture.

The reaction proceeds especially well in organic solvents, such as ethers, as for example diethyl ether, tetrahydrofurane, dioxanes, methyltetra-hydrofurane, or alcohols, as for example methanol, ethanol, propanol, isopropanol, the butanols, or hydrocarbons, as for example benzene, toluene and xylene. It is advantageous to choose reaction temperatures between —30° and +80° C.

For carrying out the process the 5-(2'.6'.6'-trimethyl-cyclohexene - (1') - yl - (1'))-3-methyl-pentadiene-(1.4)-ol-(3) (I) may for example be stirred with a triarylphosphine hydrohalide in a solvent, or a common solution of 5-(2'.6'.6'-trimethyl-cyclohexene - (1') - yl-(1'))-3-methyl-pentadiene-(1.4)-ol-(3) (I) and a triarylphosphine may be prepared and the equivalent amount of a hydrogen halide dissolved in the same or another solvent dripped in. The hydrogen halide may also be led as a gas into the solution.

The component I and the phosphine or phosphine hydrohalide may be used in any mol ratio. A slight excess of the triarylphosphine or triarylphosphine hydrohalide is advantageous. The duration of the reaction depends on the reaction temperature chosen. For example at 20° C. it amounts to about 4 hours, but also with longer or shorter reaction periods, i.e. at lower or higher temperatures, the yields are good. The amount in which the beta-ionylidene-ethyl-triaryl-phosphonium halides are formed in the crystalline form depends on the solvent. The salts usually crystallize directly from hydrocarbons and ethers, for example benzene or tetrahydrofurane, so that they can be isolated by simple filtration. When using alcohols as solvents, the beta-ionylidene-ethyl-triarylphosphonium halides formed usually remain in the solution and can be isolated by distilling off the solvent or by precipitation, for example by the addition of ether or benzene.

In the process according to this invention, the yields of the isolated crystalline products are only part of the actual yields because, depending on the solvent chosen, larger or smaller amounts of the end products remain dissolved in the mother liquor from which, however, they may be readily recovered.

The following examples will further illustrate this invention but the invention is not restricted to these examples. The parts specified in the examples are parts by weight.

*Example 1*

22 parts of 5-(2'.6'.6'-trimethyl-cyclohexene-(1')-yl-(1'))-3-methyl-pentadiene-(1.4)-ol-(3), 34 parts of triphenylphosphine hydrobromide and 50 parts of tetrahydrofurane are stirred for 2 hours at —10° C. and then for 60 hours at room temperature. After adding 30 parts of absloute ether, about 11 parts of beta-ionylidene-ethyl-triphenylphosphonium bromide of melting point 135° to 137° C. are precipitated.

*Example 2*

44 parts of 5-(2'.6'.6'-trimethyl-cyclohexene-(1')-yl-(1'))-3-methyl-pentadiene-(1.4)-ol-(3) are rapidly added at 20° C. to a solution of 60 parts of triphenylphosphine hydrochloride and 26 parts of triphenylphosphine in 200 parts of tetrahydrofurane. The mixture is stirred for another 4 hours at 20° C. and 1 hour at —5° C. 56 parts of beta-ionylidene-ethyl-triphenyl-phosphonium chloride of the melting point 113° C. are precipitated.

*Example 3*

125 parts of a 1.6-normal solution of hydrogen chloride in tetrahydrofurane are allowed to flow at —5° C. into a mixture of 28 parts of triphenylphosphine, 22 parts of 5-(2'.6'.6'-trimethyl-cyclohexene-(1')-yl-(1'))-3 - methyl-pentadiene-(1.4)-ol-(3) and 50 parts of tetrahydrofurane. The mixture is stirred for 30 hours at +5° C. 14 parts of beta-ionylidene-ethyl-triphenyl-phosphonium chloride of the melting point 114° C. are precipitated.

*Example 4*

66 parts of vinyl-beta-ionol (I) are dripped while stirring into a suspension of 117 parts of triphenylphosphine hydroiodide in 200 parts of absolute tetrahydrofurane. By gentle cooling, the temperature is kept at 20° C. After the whole of the hydroiodide has gone into solution, the mixture is stirred for another 20 hours. Then the solvent is distilled off at a bath temperature of 40° to 50° C. first in a water jet pump vacuum and toward the end in a high vacuum. The viscous residue is kneaded with absolute ether, the ether decanted off and the residual viscous oil dried at 40° C. in a high vacuum. An amorphous stiky substance is obtained. The yield is 160 parts of beta-ionylidene-ethyl-triphenylphosphonium iodide.

We claim:
1. The process of producing beta-ionylidene-ethyl-triarylphosphonium halides which comprises reacting a triarylphosphine halide from the group consisting of triphenylphosphine hydrohalide and tri-(lower-alkyl-substituted-phenyl)-phosphine hydrohalide with 5-(2'.6'.6'-trimethylcyclohexene-(1')-yl-(1'))-3-methyl - pentadiene- (1.4)-ol-(3).

2. The process as claimed in claim 1 wherein the said triarylphosphine hydrohalide is formed by adding a hydrogen halide and a triarylphosphine selected from the group consisting of triphenylphosphine and tri-(lower alkyl-substituted-phenyl)-phosphine separately to the reaction stock.

3. The process as claimed in claim 1 wherein the 5-[2'.6'.6'-trimethylcyclohexene-(1')-yl - (1')] - 3 - methyl-pentadiene-(1.4)-ol-(3) and the triarylphosphine hydrohalides are brought together in an inert organic solvent and stirred at temperatures between —30° C. and +80° C.

4. The process as claimed in claim 2 wherein the 5-[2'.6'.6'-trimethylcyclohexene-(1')-yl-(1')]-3 - methyl-pentadiene-(1.4)-ol-(3) is stirred in an inert organic solvent with said triarylphosphine and with a hydrogen halide at temperatures between —30° and +80° C.

5. A process of producing beta-ionylidene-ethyl-triphenylphosphonium bromide which comprises mixing triphenylphosphine hydrobromide with 5-[2'.6'.6'-trimethyl-cyclohexene-(1')-yl-(1')]-3-methyl-pentadiene-(1.4) - ol- (3) in an inert organic solvent at temperatures between —30° and +80° C. until the greater part of the reaction components has reacted to the quaternary phosphonium bromide.

6. A process of producing beta-ionylidene-ethyl-triphenylphosphonium iodide which comprises mixing triphenylphosphine hydroiodide with 5-[2'.6'.6'-trimethylcyclohexene-(1')-yl-(1')]-3-methyl-pentadiene-(1.4)-ol-(3) in an inert organic solvent at temperatures between —30° and +80° C. until the greater part of the reaction components has reacted to the quaternary phosphonium iodide.

7. A process of producing beta-ionylidene-ethyl-triphenylphosphonium chloride which comprises mixing triphenylphosphine hydrochloride with 5-[2'.6'.6'-trimethyl-cyclohexene-(1')-yl-(1')]-3-methyl-pentadiene-(1.4) - ol-(3) in an inert organic solvent at temperatures between —30° and +80° C. until the greater part of the reaction components has reacted to form the quaternary phosphonium chloride.

No references cited.